Feb. 23, 1937.  C. L. FORTINBERRY  2,072,000
LOCKED LICENSE TAG
Filed Sept. 24, 1934  5 Sheets-Sheet 1
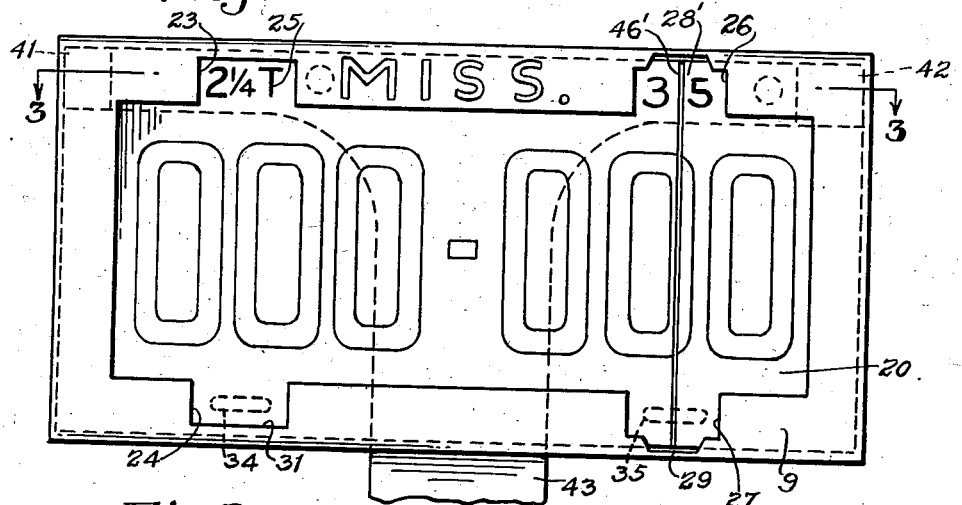
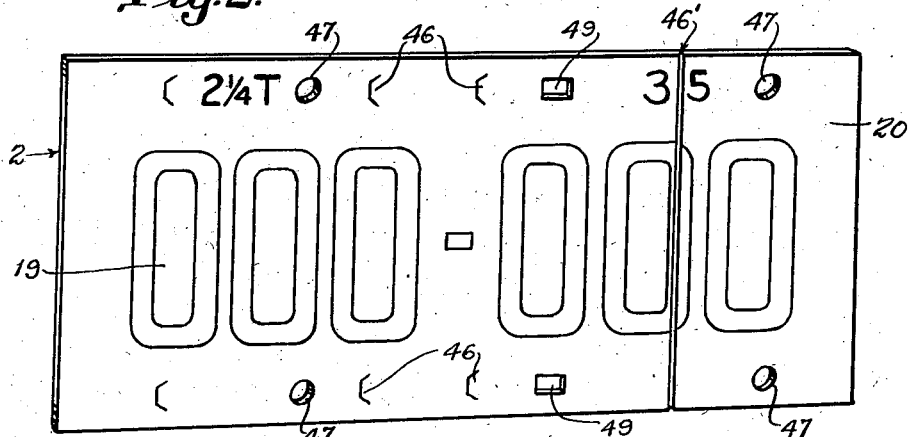
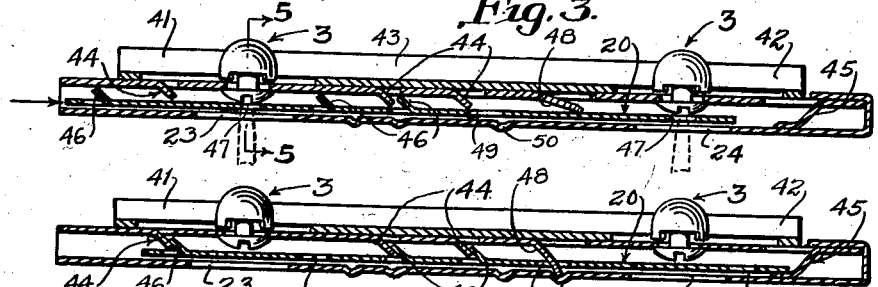
Inventor
CHARLES L. FORTINBERRY
By Mason Fenwick Lawrence
Attorneys Feb. 23, 1937. C. L. FORTINBERRY 2,072,000
LOCKED LICENSE TAG
Filed Sept. 24, 1934 5 Sheets-Sheet 2
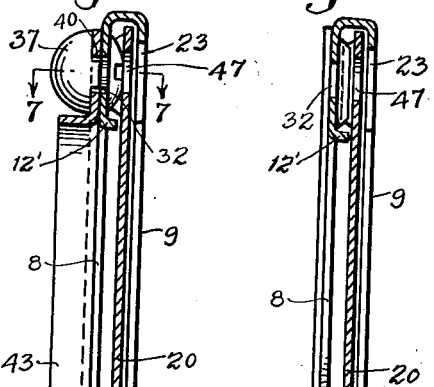
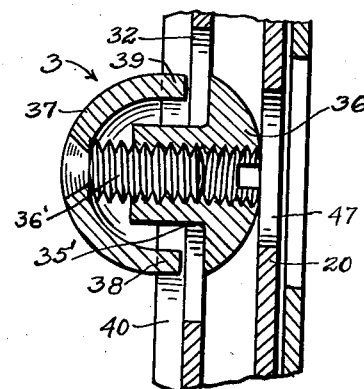
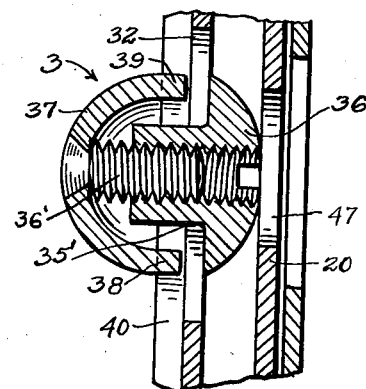
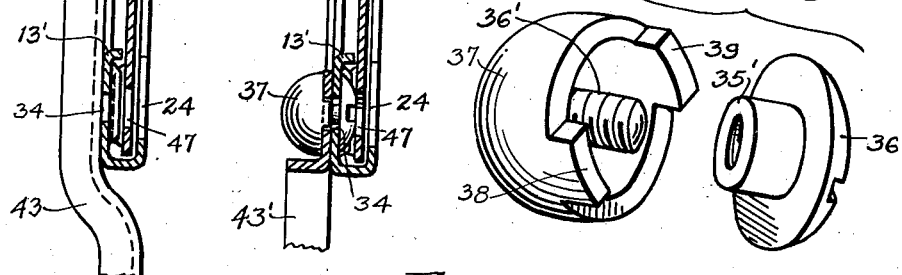
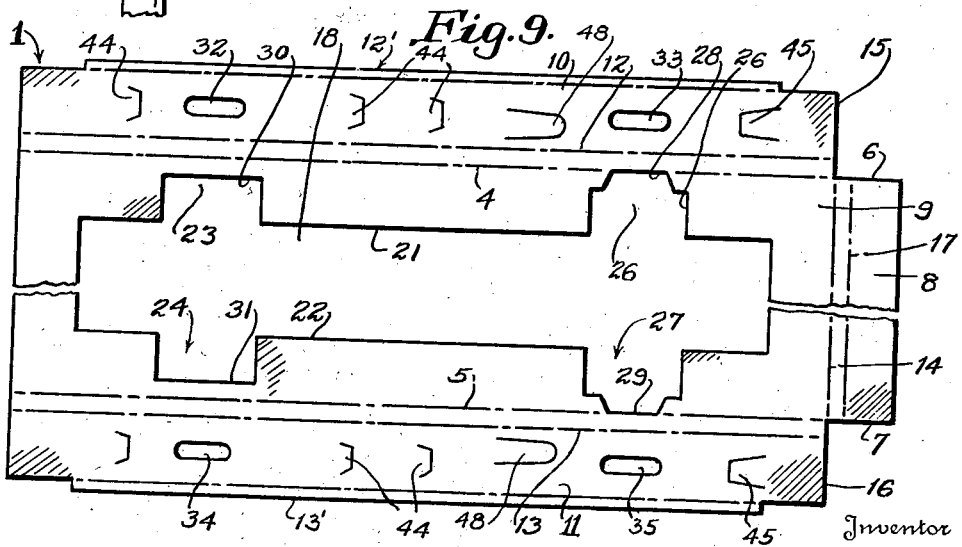
Charles L. Fortinberry, Inventor
By Mason Fenwick Lawrence
Attorneys Feb. 23, 1937.  C. L. FORTINBERRY  2,072,000
LOCKED LICENSE TAG
Filed Sept. 24, 1934  5 Sheets-Sheet 3
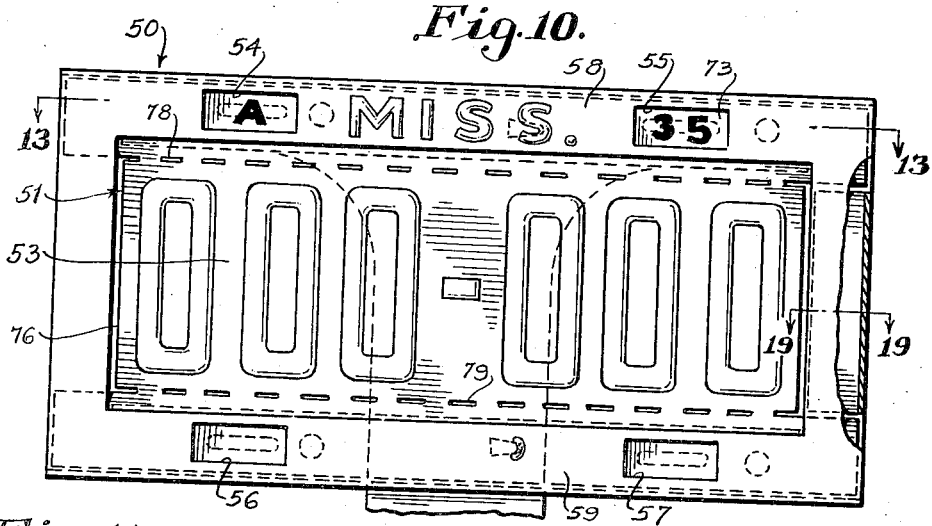
Fig. 10.
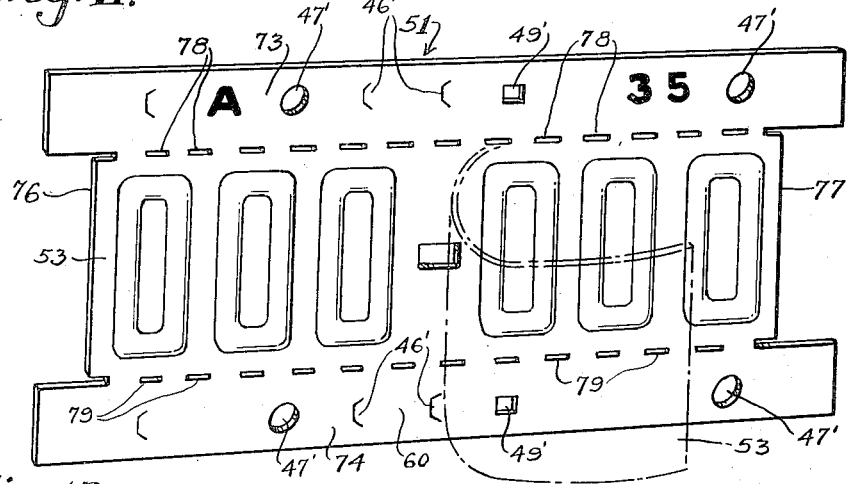
Fig. 11.
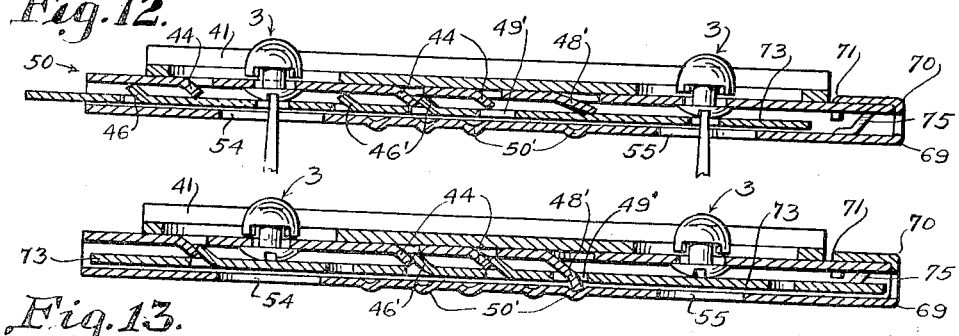
Fig. 12.
Fig. 13.
Inventor
CHARLES L. FORTINBERRY
By Mason Fenwick Lawrence
Attorneys Feb. 23, 1937. C. L. FORTINBERRY 2,072,000
LOCKED LICENSE TAG
Filed Sept. 24, 1934 5 Sheets-Sheet 4

Inventor
CHARLES L. FORTINBERRY
By Mason Fenwick Lawrence
Attorneys

Feb. 23, 1937.  C. L. FORTINBERRY  2,072,000
LOCKED LICENSE TAG
Filed Sept. 24, 1934  5 Sheets-Sheet 5

Inventor
CHARLES L. FORTINBERRY
By Mason Fenwick Lawrence
Attorneys

Patented Feb. 23, 1937

2,072,000

UNITED STATES PATENT OFFICE 2,072,000

LOCKED LICENSE TAG

Charles L. Fortinberry, Washington, D. C., assignor to The Fortinberry Company, Inc., Washington, D. C., a corporation of Delaware Application September 24, 1934, Serial No. 745,357

15 Claims. (Cl. 40—125)

The invention forming the subject matter of this application relates to automobile license tags; and is in the nature of an improvement on the lock strip license tags disclosed in my United States Patents No. 1,928,527, September 26, 1933, and No. 1,934,598, November 7, 1933. As in the patents aforesaid, the invention includes a method of forming automobile license tags to prevent removal thereof from their supporting brackets without some indication that such removal had been attempted or effected.

In each of the patented constructions, the tag includes an indicia strip provided with identification means, supplementing a license number formed on a large plate constituting the body of the tag proper. This strip is used to cover the accessible operative ends of bolts securing the plates to the brackets with which automobiles are ordinarily provided. In each case, the patents show the tag suspended from a bracket; that is, show the bodies of the tags secured by their upper edges to the laterally extending arms of the brackets. This is the usual method of securing license plates to their holding brackets.

In some States, the license plates or tags are secured by their lower edges to the upper ends of the supporting brackets. The patented tags were, of course, not adapted to be secured to brackets of the latter type; and it therefore became necessary to provide such brackets with extensions to form suspension supports for the patented tags.

The main object of the present invention, therefore, is to provide a license tag of the lock type which retains all the advantages of the patented tags; and which may be connected by either the top or bottom edges to either type of supporting bracket. In other words, the present form of tag may be suspended from a supporting bracket of the common type, or may be supported by its lower edge on a stub bracket which is not so widely used.

Other objects of the invention will become apparent as the detailed description thereof proceeds.

In the drawings:

Figure 1 is a front elevation of a license tag embodying the present invention, and shown as suspended by its upper edge from the laterally extending arms of an extension bracket;

Figure 2 is a perspective view of a license plate forming a part of the tag illustrated in Figure 1;

Figure 3 is a horizontal section taken on the line 3—3 of Figure 1, with the license plate assembled in partly locked relation to the body of the tag;

Figure 4 is a horizontal section, also on the line 3—3, showing the license plate moved after assembly of the tag on its supporting bracket into locked relation with the body of the tag;

Figure 5 is a vertical transverse section taken on the line 5—5 of Figure 3;

Figure 6 is a vertical transverse section similar to that shown in Figure 5, but illustrating the tag as secured at its lower edge to the upper end of a stub bracket;

Figure 7 is a central section to an enlarged scale of a bolt forming a part of the present invention and peculiarly adapted to co-operate with the license plate to prevent removal of the tag as a whole from the bracket;

Figure 8 is an exploded perspective of the bolt shown in Figure 7;

Figure 9 illustrates a blank stamped out to provide the supporting frame for the license plate;

Figure 10 is an elevation of a tag embodying a modification of the device shown in Figure 1, with parts broken away and shown in section;

Figure 11 is a perspective view of the license plate forming a part of the tag shown in Figure 10;

Figure 12 is a horizontal section taken on the line 12—12 of Figure 10, and showing the license plate partly inserted in its frame and in position to permit the frame to be secured to a bracket;

Figure 13 is a horizontal section taken on the same line 12—12 of Figure 10, the license plate being shown in fully inserted and locked position;

Figure 14 is a perspective view of a blank from which the frame of the modification shown in Figure 10 is stamped out;

Figure 15 is an end elevation of the device, to an enlarged scale, shown in Figure 10, and illustrating the tag as secured at its lower end to a bracket;

Figure 16 is a perspective view of a blank from which the frame of another modification of the device is stamped out;

Figure 17:
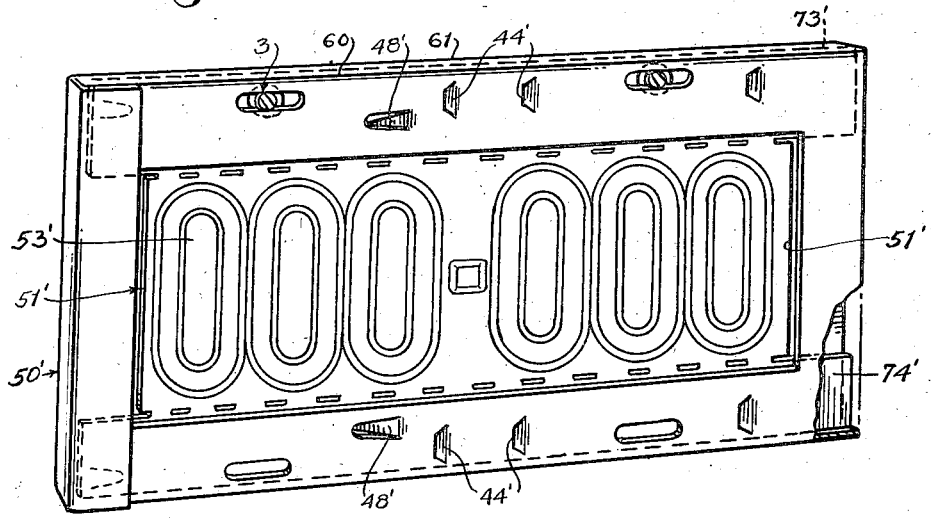
Figure 17 is a perspective view showing the rear of a tag including a frame formed from the blank shown in Figure 16.
Figure 18:
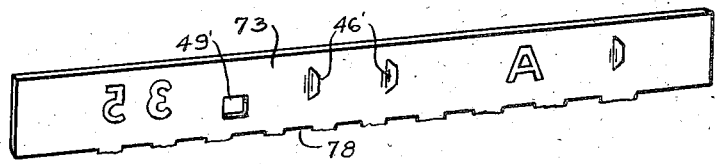
Figure 18 is a perspective showing one of the indicia strips remaining after removal of the center part of the license plate shown in Figure 11.

As shown in the drawings, the tag comprises a substantially rectangular channeled frame stamped out from a sheet 1 (see Figure 9), a license plate 20, and a bolt designated generally by the reference numeral 3. The sheet 1 is provided with parallel creases 4 and 5 alined with the end edges 6 and 7, respectively, of flap 8 extending from one edge of the main body 9 of the sheet 1. Flaps 10 and 11 extend in opposite directions from the creases 4 and 5 and are provided with creases 12 and 13, respectively, slightly spaced apart from and parallel with the creases 4 and 5. Flange members 12' and 13' extend from the outer edges of the flaps 10 and 11, and are bent inwardly to contact with the rear face of the plate 2 when the latter is inserted in its frame.

A crease 14 is formed on the sheet 1 in alinement with the ends 15 and 16 of the flaps 10 and 11; and a crease 17 is formed on the end flap 8 parallel with the crease 14 and spaced apart therefrom at a distance equal to the distance between the creases 4 and 12 and creases 5 and 13. These flaps and the creases thereon, are formed to provide a frame having channels extending around three sides of the license plate to enclose the corresponding three edges thereof.

The side flaps 10 and 11 are first bent rearwardly at right angles to the plane of the main body 9. The flaps are next bent about the creases 12 and 13 to form flanges parallel with the main body 9 of the sheet 1, and the flange members 12' and 13' are bent around the edge of the flaps 10 and 11. The end flap 8 is then bent rearwardly about the crease 14 and at right angles to the main body 9; and is next bent about the crease 17 until its main part extends between the flaps 10 and 11 and forms with these flaps a closed channel at one end of the main body 9.

The sheet 1 is stamped out at its center to form a large aperture or window 18, through which the license number 19, stamped on a license plate 20, is adapted to be exposed. This license number occupies the greater part of the license plate 20; and the window 18 in the frame of the tag must be made of a corresponding size so as to expose the number fully. The opposite longitudinal edges 21 and 22 of the window 18 are stamped out to form recesses 23 and 24 through which supplemental indicia stamped on the license plate may be exposed. As shown in Figures 1 and 2 of the drawings, the indicia 25 exposed in the recesses 23 and 24 is smaller than the license number and may be a classification indicia to indicate the character of the vehicle on which the tag is mounted.

Near the other end of the tag supporting frame or sheet 1, the opposite edges of the window 18 are stamped out to form recesses 26 and 27 adapted to expose year indicia 28' formed on the license plate 20. These recesses 26 and 27 have their inner edges 28 and 29 coincident with the creases 4 and 5, respectively, so as to expose the opposite longitudinal edges of the license plate 20 for a purpose to be explained hereinafter. It is to be noted that the inner edges 30 and 31 of the recesses 23 and 24 are spaced inwardly from the creases 4 and 5 so as to conceal and prevent access to the opposite longitudinal edges of the plate 20.

As shown in Figures 3, 4 and 9 of the drawings, the flaps 10 and 11 are provided with slots 32, 33, 34 and 35 adapted to receive with snug sliding fit the cylindrical extension 35' of the nut 36 forming a part of the bolt shown in Figures 7 and 8 of the drawings. These cylindrical extensions 35' are internally screwthreaded to receive the screwthreaded shank 36' of the bolt 3 having a hemispherical head 37 suitably secured to one end thereof. This hemispherical head is provided at diametrically opposite points with lugs 38 and 39 adapted to seat in slots 40 formed in the laterally extending arms 41 and 42 of the supporting bracket 43. This bolt 3 is a modified form of the bolt illustrated in Figure 17 of my Patent No. 1,934,598 and is designed to prevent bodily removal of the tag from the supporting bracket without mutilation of the license plate 20.

To provide for securing the channel frame, formed by the sheet 1, to the bracket 43, with the license plate and frame partly assembled, the flaps 10 and 11 are stamped to provide spaced apart locking tabs 44 extending in the direction of the end flap 8 and inwardly of the channels formed by the flaps 10 and 11. The flaps 10 and 11 near the flap 8, are also provided with stop tabs 45 inwardly directed in their respective channels and extending in the direction opposite to that of the tabs 44.

The license plate 20 is provided with rows of tabs 46 extending lengthwise thereof and positioned so as to co-operate with the tabs 44 on the channel frame 9 to lock the plate against removal from the frame after it has once been inserted in the channels of the frame. It will be understood, of course, that the tabs 46 on the license plate 20, must be spaced apart at the same distances from each other as the tabs 44 on the channel frame 9. The license plate 20 is also provided with four apertures 47 alined with the rows of tabs 46 and spaced apart so as to expose the heads of the nuts 36, which are assembled in the channels between the license plate and the flaps 10 and 11.

As in my previous Patent No. 1,934,598, the tag is intended to be partly assembled as shown in Figure 3, of the drawings, before being turned over to the purchaser; that is, the plate 20 is inserted just far enough into the channels of the frame 9 to bring the apertures 47 in registry with the heads of the nuts 36. In this position, the nuts can be turned by a narrow screw driver inserted through the apertures 47, to release the bolts 3, as a preliminary to mounting the tag as a whole on the arms 41 and 42 of the bracket support 43.

As will be apparent from Figure 3 of the drawings, the license plate 20, in the partly inserted position shown, cannot be removed from the channel frame; but can be moved to the right of said position. Therefore, it is not possible for any user to remove the nut part of the bolts 3 from the partly assembled tag, since these nuts are larger in diameter than the apertures 47. After the tag has been mounted on the extension arms 41 and 42, in the manner shown in Figures 2 and 3 of the drawings, the license plate 20 must be moved to the right until the right hand end thereof contacts with the stop tabs 45. In this position only, the classification and year indicia of the plate 20 are exposed in the recesses 23 and 26 of the channel frame. In this position, too, the tabs 46 of the license plate 20 interlock with the tabs 44 and with the stop 45, securely locking the plate 20 to the channel frame and bracket support.

It will be evident from inspection of the drawings that the plate 20, when positioned as shown in Figures 1 and 4, cannot be removed from the channeled frame without mutilating either the frame or the plate. Whenever it becomes necessary to renew the license, the plate 20 must be removed from its frame. It cannot be so removed without breaking it.

To facilitate this breaking, as a preliminary to removal from the frame, the plate 20 is weakened by scoring it across that part which is exposed between the edges 28 and 29 of the recesses 26 and 27, respectively, when the tag is fully assembled on its bracket. This scoring 46' extends clear across the plate 20 and through the year indicia thereon. A screwdriver or similar tool can be inserted under either of the edges of the plate 20 exposed in the recesses 28 and 29, and used to break the plate along the scoring 46'. The two parts of the plate can then be pulled from the channeled frame through the recesses 28 and 29.

The removal of the parts of plate 20 will expose the heads of the nuts 36, which can then be operated to remove the channeled frame from the bracket support. Of course, a new license plate can then be inserted in the channeled frame without removing it from the support; and when fully inserted, will prevent removal of the frame without mutilation either of the frame or license plate.

Figure 6 of the drawings merely illustrates the tag as secured to a stub bracket 43'. The method of assembly of the tag, and its operation, is identical with that already disclosed; except, of course, that the securing operation is effected through the lower edge of the tag instead of the upper edge. This tag construction avoids the necessity of substituting an extension bracket, such as the bracket 43, for the stub bracket 43' in those States, or on cars, where the tag is to be secured by its lower edge to its support. At the same time, it is also adapted to be just as readily secured by its upper edge to a suspension bracket, such as is in common use, or to an extension bracket of the type shown in Figures 1, 3, 4 and 5 of the drawings.

The end flap 8 not only serves as a stiffening member for the frame, but also serves to prevent such bending of the license plate as might result in sliding one of the edges of the plate free of the longitudinal channels, so that the plate as a whole could be removed without mutilation. This flap, of course, would not be necessary in cases where the tag would be mounted on an extension bracket such as is shown in Figure 5 of the drawings, because the bracket itself would prevent such bending of the license plate as would permit removal of the plate from its channeled frame without mutilation.

In order to prevent rattling of the plate in the frame, it is evident that the tabs 44 and 46 should extend substantially across the frame channels as shown in Figures 3 and 4. To supplement these tabs the rear wall of the frame may be provided with long tabs 48, adapted, when the plate 20 is fully inserted in its frame, to pass through the apertures 49 in the license plate and snap into a recess or indentation 50 formed in the front wall of the frame. It will be evident that these long tabs extending clear across the channels and through the license plate 20, form very strong supplemental locks to prevent withdrawal of the plate through the open end of the frame.

The form of the invention, illustrated in assembled form in Figure 10, comprises a frame 50, formed from the blank shown in Figure 14, and a license plate 51 shown in Figure 11. The blank of Figure 14 has a large window 52 formed therein to display the central body part 53 of the license plate 51. Smaller openings 54, 55, 56 and 57 are cut out of the sides 58 and 59 of the frame, for the purpose of displaying the class and year indicia of the plate 51.

The side 58 of the blank is bent around the parallel creases 60, 61 and 62 to form a locking channel 63 at the upper end of the frame. Similarly the side 59 is bent around the parallel creases 64, 65 and 66 to form the lower locking channel 67. As shown in Figure 10, the left hand end of the frame 50 is open throughout its length. The other end of the frame is only partly closed by a member 68 bent around the parallel creases 69, 70, and 71 to form a channel 72 in which the right hand end of the central body part 53 of plate 51 is received (see Figure 19).

As shown in Figure 15, the channels 63 and 67 are open at their right hand ends on opposite ends of the member 68; and, are left open to permit the removal of the locking members 73 and 74 of the plate 51. A stop tab 75 is stamped from the member 68 and extends into the channel 72 to limit the movement of the license plate 51 in the right hand direction.

Figure 19:
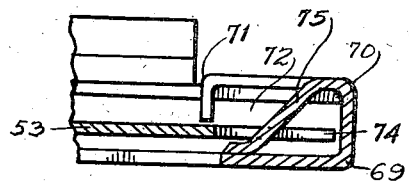
Figure 19 is a fragmentary section, to an enlarged scale, taken on the line 19—19 of Figure 10.

The license plate 51 is recessed at each end sufficiently to expose the edges 76 and 77 within the window 52, when the plate is fully inserted in the frame as shown in Figures 10, 13 and 19. The locking members 73 and 74 of plate 51 are divided from the central body part 53 by lines 78 and 79 of indentations or perforations, designed to weaken the plate along these lines to permit the central part to be readily separated from the locking members, as indicated in Figure 11.

The arrangement of co-operating locking tabs on the members 73 and 74 and the rear walls of the channels 63 and 67 are substantially the same as in the form shown in Figures 1, 2, 3 and 4. A single stop 75 at the center of the right hand end of the frame 50 serves the same purpose as the stops 45 in said form. The method of assembling the plate and frame, and of securing the frame to a bracket is the same and is clearly indicated in Figures 12 and 13.

In Figure 15, the tag is illustrated as secured by its lower edge to the bracket 80. When it becomes necessary or desirable to remove the plate from its frame, the operator can insert a screw driver, or similar tool under either end, 76 or 77 of the central part 53 of the plate to raise it into position where it can be pulled to tear it apart from the locking members 73 and 74. When this is done, it is obvious that the said members 73 and 74 may be pulled through the openings at the right hand end of the frame.

In the form of the invention shown in Figures 16 and 17, a license plate 51' similar in all respects to the plate 51 is inserted in and locked in a frame 50' which is the same in every respect as frame 50; except that the right hand end of frame 50' is closed throughout its length. In this case, when the central part 53' of plate 51' is separated from the members 73' and 74', these members can be moved laterally toward the center of the frame, and removed through the window 52. In Figures 16 and 17 the parts corresponding to similar parts in Figures 10 and 11 are designated by the same reference numerals primed.

It is thought that the invention and numerous of its attendant advantages will be understood from the foregoing description and it is obvious that changes may be made in the form, construction and arrangement of the several parts without departing from the spirit or scope of my invention, or sacrificing any of its attendant advantages; the form herein described being a preferred embodiment for the purpose of illustrating my invention.

What I claim is:

1. A license tag comprising a substantially rectangular frame having channels formed along opposite edges thereof, and a license plate slidable in one direction in said channels, said plate and channels having interlocking tabs formed thereon to lock the plate against movement in the opposite direction in said channels.

2. A license tag comprising a substantially rectangular frame having channels formed along opposite edges thereof, and a license plate slidable in one direction in said channels, said plate and channels having interlocking tabs formed thereon to lock the plate against movement in the opposite direction in said channels, and said channels having stops engageable with said plate to limit the movement of the plate in the first named direction.

3. A license tag comprising a plate holder shaped as a substantially rectangular frame having channels extending along opposite edges thereof, the rear walls of said channels having bolt receiving apertures and the front walls thereof being provided with cut-out portions directly in front of said apertures, a stop in one of said channels, and a license plate slidable into said channels toward said stop to cover said apertures, said channels and plate being provided with co-operating means to prevent withdrawal of the plate from said channel, after the plate has made contact with said stop.

4. A license tag comprising a plate holder shaped as a substantially rectangular frame having channels extending along opposite edges thereof, the rear walls of said channels having bolt receiving apertures and the front walls thereof being provided with cut-out portions directly in front of said apertures, a stop in one of said channels, and a license plate slidable into said channels toward said stop to cover said apertures, said channels and plate being provided with co-operating means to prevent withdrawal of the plate from said channels, after the plate has made contact with said stop, the opposite edges of said plate being exposed in two of said cut-out portions to facilitate breaking of the plate between said portions.

5. A license tag comprising a plate holder shaped as a substantially rectangular frame having channels extending along opposite edges thereof, the rear walls of said channels having bolt receiving apertures and the front walls thereof being provided with cut-out portions directly in front of said apertures, a stop in one of said channels, and license plate slidable in said channels toward said stop to cover said apertures, said channels and plate being provided with co-operating means to prevent withdrawal of the plate from said channel after the plate has made contact with said stop, said plate being weakened across that part extending between opposite cut-out portions to facilitate breaking thereof at said part, the opposite edges of said part being exposed to give access thereto and to permit withdrawal of the broken parts from said channels.

6. A license plate comprising a frame having a substantially rectangular display window and having channels extending along opposite edges thereof, the rear walls of said channels having bolt receiving apertures and the front walls being provided with cut-out portions directly in front of said apertures, a stop at one end of said frame, a license plate slidable in said channels toward said stop to cover said apertures, said plate being recessed to expose edges adjacent the opposite ends of said window and being weakened along lines located within said window and parallel to the inner edges of the opposite sides thereof, said plate and channels having co-operating members for locking the plate in said frame after movement into contact with said stop.

7. A license tag comprising a frame having a substantially rectangular display window and having channels on opposite sides of said window, said channels and plate having co-operating means for locking the plate in a predetermined display position in said frame, the exposed part of said plate being weakened along lines adjacent opposite sides of said window and having end edges located within said window adjacent opposite ends thereof.

8. A license tag comprising a frame having a substantially rectangular display window, a license plate, means for locking said plate to said frame, said plate having part thereof exposed in said window and weakened along lines adjacent opposite sides of said window and also having end edges located within said window adjacent opposite ends thereof, said locking means being releasable only by separation of said part from the remainder of said plate.

9. A license tag comprising a substantially rectangular frame having channels formed along opposite edges thereof, and a license plate slidable in one direction in said channels, said plate and one of said channels having interlocking tabs formed thereon to lock the plate against movement in the opposite direction in said channels.

10. A license tag comprising a substantially rectangular frame having channels formed along opposite edges thereof, and a license plate slidable in one direction in said channels, said plate and one of said channels having interlocking tabs formed thereon to lock the plate against movement in the opposite direction in said channels, and one of said channels having a stop engageable with said plate to limit the movement of the plate in the first named direction.

11. A license tag comprising a plate holder shaped as a substantially rectangular frame having channels extending along opposite edges thereof, the rear wall of one of said channels having bolt receiving apertures and the front wall of said channel being provided with cut-out portions directly in front of said apertures, a stop in one of said channels, and a license plate slidable into said channels toward said stop to cover said apertures, one of said channels and said plate being provided with co-operating means to prevent withdrawal of the plate from said channels, after the plate has made contact with said stop.

12. A license tag comprising a plate holder shaped as a substantially rectangular frame having channels extending along opposite edges thereof, the rear wall of one of said channels having bolt receiving apertures and the front wall of said channel being provided with cut-out portions directly in front of said apertures, a stop in one of said channels, and a license plate slidable into said channels toward said stop to cover said apertures, one of said channels and plate being provided with co-operating means to prevent withdrawal of the plate from said channels, after the plate has made contact with said stop, the front wall of the other channel being also provided with cut-out portions, the opposite edges of said plate being exposed in cut-out portions on the opposite front walls to facilitate breaking of the plate between said portions.

13. A license tag comprising a plate holder shaped as a substantially rectangular frame having channels extending along opposite edges thereof, the rear wall of one of said channels having bolt receiving apertures and the front wall of said channel being provided with cut-out portions directly in front of said apertures, a stop in one of said channels, and license plate slidable in said channels toward said stop to cover said apertures, one of said channels and said plate being provided with co-operating means to prevent withdrawal of the plate from said channel after the plate has made contact with said stop, the front wall of the other channel being also provided with cut-out portions, said plate being weakened across that part extending between opposite cut-out portions to facilitate breaking thereof at said part, the opposite edges of said part being exposed to give access thereto and to permit withdrawal of the broken parts from said channels.

14. A license plate comprising a frame having a substantially rectangular display window and having channels extending along opposite edges thereof, the rear wall of one of said channels having bolt receiving apertures and the front wall of said channel being provided with cut-out portions directly in front of said apertures, a stop at one end of said frame, a license plate slidable in said channels toward said stop to cover said apertures, said plate being recessed to expose edges adjacent the opposite ends of said window and being weakened along lines located within said window and parallel to the inner edges of the opposite sides thereof, said plate and one of said channels having co-operating members for locking the plate in said frame after movement into contact with said stop.

15. A license tag comprising a frame having a substantially rectangular display window and having channels on opposite sides of said window, one of said channels and said plate having co-operating means for locking the plate in a predetermined display position in said frame, the exposed part of said plate being weakened along lines adjacent opposite sides of said window and having end edges located within said window adjacent opposite ends thereof.

CHARLES L. FORTINBERRY.